United States Patent
Dykstra et al.

(10) Patent No.: US 11,143,013 B2
(45) Date of Patent: Oct. 12, 2021

(54) DOWNHOLE VIBRATION CHARACTERIZATION

(71) Applicant: Halliburton Energy Services, Inc., Houston, TX (US)

(72) Inventors: Jason D. Dykstra, Spring, TX (US); Yiming Zhao, Katy, TX (US); Venkata Madhukanth Vadali, Houston, TX (US); Xingyong Song, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 379 days.

(21) Appl. No.: 16/074,001

(22) PCT Filed: Mar. 14, 2016

(86) PCT No.: PCT/US2016/022310
§ 371 (c)(1),
(2) Date: Jul. 30, 2018

(87) PCT Pub. No.: WO2017/160272
PCT Pub. Date: Sep. 21, 2017

(65) Prior Publication Data
US 2019/0040731 A1    Feb. 7, 2019

(51) Int. Cl.
*E21B 44/02* (2006.01)
*E21B 47/00* (2012.01)
(Continued)

(52) U.S. Cl.
CPC .............. *E21B 44/02* (2013.01); *E21B 44/00* (2013.01); *E21B 47/00* (2013.01); *G01N 29/4454* (2013.01)

(58) Field of Classification Search
None
See application file for complete search history.

(56) References Cited

U.S. PATENT DOCUMENTS

| 4,903,245 A | 2/1990 | Close et al. |
| 5,321,981 A | 6/1994 | Macpherson |

(Continued)

FOREIGN PATENT DOCUMENTS

WO    2014035426 A1    3/2014

OTHER PUBLICATIONS

International Patent Application No. PCT/US2016/022310, "International Search Report and Written Opinion," dated Dec. 14, 2016, 17 pages.

(Continued)

*Primary Examiner* — Brent A. Fairbanks
(74) *Attorney, Agent, or Firm* — Kilpatrick Townsend & Stockton LLP

(57) ABSTRACT

Vibrational behavior of a wellbore operation can be characterized as a vibrational map relating a modeled or sensed vibration level of the operation's equipment to operational parameters of the wellbore operation. The operational parameters can be controllable by settings of the equipment. The map can include multiple contour lines, each representing a set of adjacent coordinates of operational parameters that have the same vibrational level. Tracing a contour line can include determining vibration at a pre-tracing coordinate, adjusting the operational parameters until the vibration level to be mapped is reached at a tracing origin coordinate, then varying the operational parameters while keeping the vibration level constant until the tracing origin or a bound of the operational parameters is reached. Vibration levels having multiple, non-intersecting contour lines can be found by repeating tracing from a different pre-tracing coordinate.

20 Claims, 10 Drawing Sheets

(51) Int. Cl.
*E21B 44/00* (2006.01)
*G01N 29/44* (2006.01)

(56) References Cited

U.S. PATENT DOCUMENTS

| | | |
|---|---|---|
| 7,082,821 B2 | 8/2006 | Chen et al. |
| 8,589,136 B2 | 11/2013 | Ertas et al. |
| 8,636,060 B2 | 1/2014 | Hernandez |
| 8,688,382 B2 | 4/2014 | Spencer |
| 2008/0275574 A1* | 11/2008 | Testa .............. G05B 19/404 700/29 |
| 2009/0225073 A1* | 9/2009 | Baker, III .............. G06T 17/05 345/419 |
| 2010/0032165 A1 | 2/2010 | Bailey et al. |
| 2012/0130693 A1* | 5/2012 | Ertas .............. E21B 45/00 703/2 |
| 2012/0229290 A1 | 9/2012 | Gerez et al. |
| 2014/0190747 A1 | 7/2014 | Hay |
| 2014/0238662 A1 | 8/2014 | Prieto |
| 2014/0277752 A1* | 9/2014 | Chang .............. E21B 44/00 700/275 |
| 2015/0023137 A1 | 1/2015 | Benson |
| 2015/0105912 A1 | 4/2015 | Dykstra |
| 2015/0129306 A1* | 5/2015 | Coffman .............. E21B 44/00 175/25 |

OTHER PUBLICATIONS

Schlumberger, "Drillstring Vibrations and Vibration Modeling", http://www.slb.com/~/media/Files/drilling/brochures/drilling_opt/drillstring_vib_br.pdf, 2010, 4 pages.

* cited by examiner

DOWNHOLE VIBRATION CHARACTERIZATION

TECHNICAL FIELD

The present disclosure relates to wellbore operations generally and more specifically to vibration characterization in wellbore operations.

BACKGROUND

Wellbore operations can involve the use of tools in a wellbore, such as drilling tools, that produce vibrations. Vibrations may be generated as a result of actuation of the tool itself, movement of a drill string or other conveying device, movement of or other equipment, interactions of fluids in or near the equipment, or other sources. In an example, during drilling, the bottom hole assembly (BHA) and drill string repeatedly contact and detach from the wellbore, producing reaction forces on the BHA and drill string. Even with rigid tubulars, the relatively long length of the drill string can exhibit complex vibration behavior when subject to reaction forces and loads. Vibrations can become severe, such as due to sub-optimal operational parameters, due to difficult formations, or other for other reasons.

It can be desirable to control vibrations. For example, substantial vibration can damage the drilling device, uncouple tubulars in the drill string (e.g., necessitating stopping the drilling to retrieve the tubulars), cause excessive wear to the drill bit (e.g., necessitating stopping the drilling to replace the drill bit), damage the wellbore, and cause an inability to maintain desired drilling direction, among others. These problems can be expansive, expensive, and time consuming to fix, or may not be possible to fix.

Certain types of vibration (e.g., stick-slip vibration) can be mitigated or even avoided by properly choosing the operational parameters. But determining the proper operational parameters is extremely complicated due to the variations between drilling jobs, the complex behavior of the equipment in the downhole environment, and some vibrations being unpredictable. A more complete understanding of the vibration characteristics of a particular wellbore operation may be needed to help control vibrations.

BRIEF DESCRIPTION OF THE DRAWINGS

The specification makes reference to the following appended figures, in which use of like reference numerals in different figures is intended to illustrate like or analogous components.

DETAILED DESCRIPTION

Figure 1:
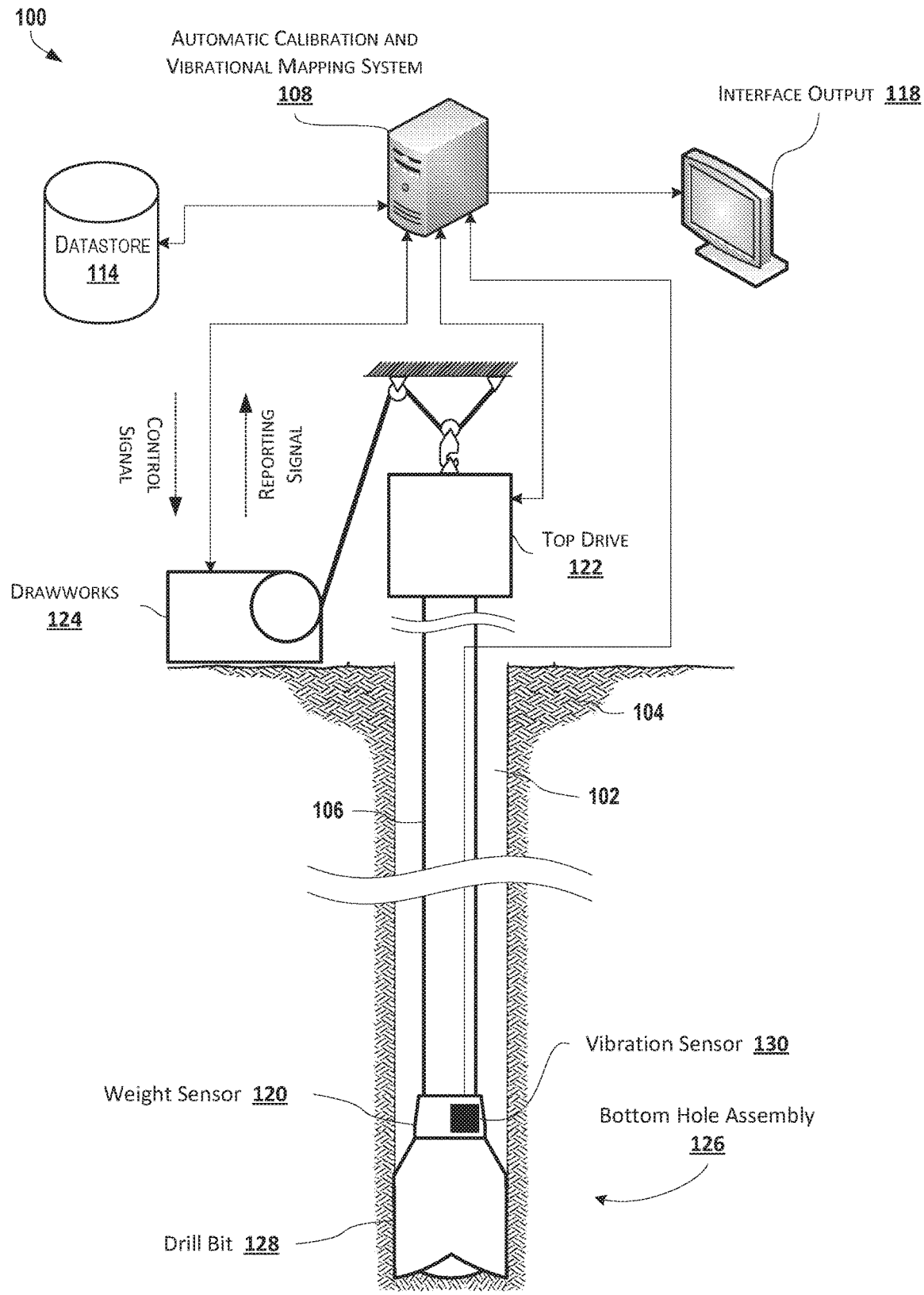
FIG. 1 is a schematic diagram of a wellbore servicing system including an automatic vibrational mapping system according to certain aspects of the present disclosure.

Certain aspects and features of the present disclosure relate to characterizing vibrational behavior of a wellbore operation, such as a drilling operation. Vibrational behavior can be characterized as a vibrational map that relates at least two operational parameters to a modeled or sensed vibration level of the operation's equipment. Examples of operational parameters can include drilling parameters, such as weight on bit, mud circulation, revolutions-per-minute, or other such parameters. Examples of an operation's equipment can include various wellbore tools, such as a drill string and bottom hole assembly for a drilling operation. The map can include multiple contour lines, each representing a set of adjacent parameter coordinates having the same vibrational level. The map can include multiple, non-intersecting contour lines for each vibration level present. Certain aspects and features of the disclosure relate to locating destructive vibrations adaptively using a searching algorithm. The searching algorithm can be a systematic and automatic method for matching and predicting vibration behavior by tracing vibrational contour lines. Tracing can include determining vibration at a pre-tracing coordinate, adjusting the parameters (e.g., in a straight line) until the vibration level to be mapped is reached at a tracing origin coordinate, then varying the parameters while keeping the vibration level constant until the tracing origin or a parameter bound is reached.

Vibration levels having multiple, non-intersecting contour lines can be found by repeating tracing from a different pre-tracing coordinate. A single vibration level can be re-traced multiple times from different pre-tracing coordinates until a threshold level of confidence is reached that all non-intersecting contours have been found for that vibration level. Tracing a single vibration level can occur for one or more vibration levels present within the bounds of the operational parameters. In some cases, the vibration levels traced can be preset, limited to a maximum number, limited to a preset number, limited to a minimum distance between consecutive vibration levels, limited to a range of vibration levels, not limited, or otherwise.

The mapping process can identify the location and magnitude of potentially undesirable (e.g., destructive or efficiency harming) vibrations within the operating bounds of the operational parameters. In some cases, mapping is automatically carried out in relevant spaces where the operational parameters have a high probability of being used in a live system. In some cases, the vibrations during a drilling operation are mapped and the operational parameters include weight on bit (WOB) and revolutions-per-minute (RPM) of the drill string. Other operational parameters can be used, such as mud circulation (e.g., pump flow rate), differential pressure, or other parameters that may have some relationship to vibration.

Certain aspects and features disclosed herein can be used to map vibrational behavior based on operational parameters associated with vibration. However, the aspects and features may also be used to generate characterization maps of output variables other than vibrational intensity. It may be desirable to control or optimize (e.g., minimize or maximize) these output variables. The characterization maps may be generated based on operational parameters associated with those output variables. For example, to minimize cost, a characterization map can be generated that relates cost to the operational parameters (e.g., WOB and RPM). This cost characterization map can be used to determine control schemes, optimum starting points, or new coordinates for the operational parameters for a particular wellbore operation. In some cases, live cost mapping or live recalibration of an existing cost map can improve the wellbore operation and help minimize cost. Any other suitable variable, such as any efficiency measurement (e.g., based on cost, time, waste, worker hours, equipment usage, or others), mud usage, rate of penetration, rate of drill wear, or any other appropriate variable, can be mapped.

The characterization can be generated using data from a mathematical model or from realtime measurements from a live wellbore operation. In some cases, the characterization can be used to inform a driller, such as through an interface output (e.g., a computer monitor or printer). In some cases, the characterization can be used in an automatic control system to optimize the process (e.g., drilling process).

The characterization process (e.g., contour mapping) can be adaptive, such that the searching algorithm is applied to only the highest areas of interest, thereby reducing the required perturbations of the operational parameters.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

FIG. 1 is a schematic diagram of a wellbore servicing system 100 including an automatic calibration and vibrational mapping system 108 according to certain aspects of the present disclosure. The automatic calibration and vibrational mapping system 108 can include one or more processors embodied on one or more machines for performing the functions described herein. The automatic calibration and vibrational mapping system 108 can include or be coupled to a datastore 114 for storing or retrieving data and can include or be coupled to an interface output 118 (e.g., a computer monitor, printer, or other output) for displaying or otherwise outputting information.

The wellbore servicing system 100 can also include a wellbore 102 penetrating a subterranean formation 104 for the purpose of recovering hydrocarbons, storing hydrocarbons, disposing of carbon dioxide, or the like. The wellbore 102 can be drilled into the subterranean formation 104 using any suitable drilling technique and any suitable drilling equipment. While shown as extending vertically from the surface in FIG. 1, in other examples the wellbore 102 can be deviated, horizontal, or curved over at least some portions of the wellbore 102. The wellbore 102 can be cased, open hole, contain tubing, and can include a hole in the ground having a variety of shapes or geometries.

A service rig, such as a drilling rig, a completion rig, a workover rig, or other mast structure or combination thereof can support a bottom hole assembly 126 and drill string 106 in the wellbore 102, but in other examples a different structure can provide such support. The bottom hole assembly 126 can include a drill bit 128. In alternate operations, other conveyances besides a drill string 106 may be used with other tools besides a bottom hole assembly 126, such as a wireline, slickline, cable, alternate tubular (e.g. casing string, completion string, coiled tubing or the like), or other structure suitable for supporting a tool downwell. In some aspects, a service rig can include a derrick (not shown) with a rig floor through which the drill string 106 extends downward from the service rig into the wellbore 102. In an offshore situation, the service rig can be supported by risers or piers extending downwards to a seabed in some implementations. Alternatively, the service rig can be supported by columns sitting on hulls or pontoons (or both) that are ballasted below the water surface, which may be referred to as a semi-submersible platform or rig. In an off-shore location, tubing may extend from the service rig to exclude sea water and contain drilling fluid returns. A drawworks 124 can support a top drive 122, which can support the drill string 106. The drawworks 124 can control the vertical movement of the top drive 122, which can control the rotational movement of the drill string 106, as well as facilitate in assembling and breaking down the drill string 106. Other mechanical mechanisms that are not shown may control the run-in and withdrawal of the drill string 106 in the wellbore 102. Examples of these other mechanical mechanisms include a slickline unit, a wireline unit including a winching apparatus, another servicing vehicle, or other such mechanisms.

The wellbore servicing system 100 in FIG. 1 depicts an automatic calibration and vibrational mapping system 108 used with a drilling system engaged in a drilling process. However, the automatic calibration and vibrational mapping system 108 can be used with other tools besides a drilling apparatus and during processes other than drilling a wellbore 102. Additionally, the automatic calibration and vibrational mapping system 108 can be used separate from any oilfield processes or operations, such as during a planning phase prior to drilling the wellbore 102.

The automatic calibration and vibrational mapping system 108 can characterize vibrations, such as by creating a vibrational map, based on modeled data (e.g., estimated in a computer system) or sensed data (e.g., measured during a live drilling operation). A vibrational map can be a collection of data relating two operational parameters to vibrational intensity. Operational parameters can be any parameter that is adjustable, directly or indirectly, during the oilfield process. For example, weight-on-bit (WOB), rotational speed of the drill bit 128, and mud circulation, are suitable operational parameters for a drilling operation.

Each operational parameter can be associated with one or more pieces of equipment of the drilling system. For example, the operational parameter weight-on-bit may be associated with a drawworks 124 or other device for controlling weight-on-bit; the operational parameter rotational speed of the drill bit 128 may be associated with a top drive 122 or other device for controlling rotational speed; and the operational parameter mud circulation can be associated with a mud circulation pump or other device for controlling mud circulation. Equipment of the drilling system associated with an operational parameter may receive control signals containing settings information for adjusting or setting the operational parameter associated with that piece of equipment. For example, the drawworks 124 can receive a control signal containing control information for setting a specific desired weight-on-bit, which the drawworks 124 can use to maintain the desired weight-on-bit. Additionally, equipment of the drilling system associated with an operational parameter may transmit reporting signals containing reporting information for an actual operational parameter as measured by the equipment, or the currently set desired operational parameter. For example, the drawworks 124 can provide a reporting signal containing information related to the actual weight-on-bit as sensed by the drawworks 124, or its currently set desired weight-on-bit (e.g., as set by a previous control signal). As described above, the settings of equipment of the drilling system may directly correspond to the operational parameters of the drilling system.

A vibrational map can be represented as a collection of data points, one or more equations (e.g., approximating a dataset), a three-dimensional surface, a two-dimensional heat map, a two-dimensional contour plot, or other representation of three dimensions (e.g., the two operational parameters and the vibrational intensity). A vibrational map may be graphical (e.g., a contour plot) or non-graphical (e.g., a set of data points or equations). In some cases, a vibrational map can include more than two operational parameters, in which case the vibrational map may be represented in more than three dimensions.

In some cases, the automatic calibration and vibrational mapping system 108 can access a model (e.g., stored in the datastore 114 or being run on a remote computer) to obtain estimated vibrational intensity data for given operational parameters. Any suitable model can be used that relates the operational parameters to the desired resultant function (e.g., vibrational intensity). In an example, a model for estimating vibrational intensity of a drill string and bottom hole assembly for given drilling operational parameters can use Timoshenko's beam theory, as described in further detail herein.

In some cases, the automatic calibration and vibrational mapping system 108 can be coupled to oilfield equipment to obtain sensed vibrational intensity data for given operational parameters. The automatic calibration and vibrational mapping system 108 can be coupled to the drawworks 124 or other suitable sensor for determining a hook load (e.g., weight of the drill string 106 and bottom hole assembly 126 as sensed from the surface). The hook load can be used to calculate an estimated weight-on-bit (WOB). The automatic calibration and vibrational mapping system 108 can be coupled to a weight sensor 120 of the bottom hole assembly 126 to determine WOB. The automatic calibration and vibrational mapping system 108 can be coupled to a top drive 122 or other suitable sensor for determining a rotation speed of the drill string 106 to determine the rotation speed of the drill string 106. The automatic calibration and vibrational mapping system 108 can be coupled to one or more vibration sensors 130 to measure a vibrational intensity of one or both of the drill string 106 and bottom hole assembly 126. Vibration sensors 130 can be located in or near the bottom hole assembly 126 and drill string 106. Examples of suitable vibration sensors 130 can include accelerometers, strain gauges (e.g., distributed fiber optic sensors), and other sensors capable of determining vibrational intensity. The automatic calibration and vibrational mapping system 108 can be coupled to other devices or sensors for measuring other operational parameters, such as a flow sensor for measuring mud circulation.

In some cases, the automatic calibration and vibrational mapping system 108 can be coupled to oilfield equipment to control the equipment. The automatic calibration and vibrational mapping system 108 can be coupled to the drawworks 124 or other suitable apparatus for automatically adjusting the WOB. The automatic calibration and vibrational mapping system 108 can be coupled to the top drive 122 or other suitable apparatus for automatically adjusting the rotation speed of the drill string 106. The automatic calibration and vibrational mapping system 108 can be coupled to other apparatuses for controlling other operational parameters, such as a pump for controlling mud circulation.

In some cases, the automatic calibration and vibrational mapping system 108 can store vibrational map data in the datastore 114. In some cases, the automatic calibration and vibrational mapping system 108 can provide vibrational maps or other data derived using the vibrational maps to the interface output 118 to be output to an operator or other user.

Figure 2:
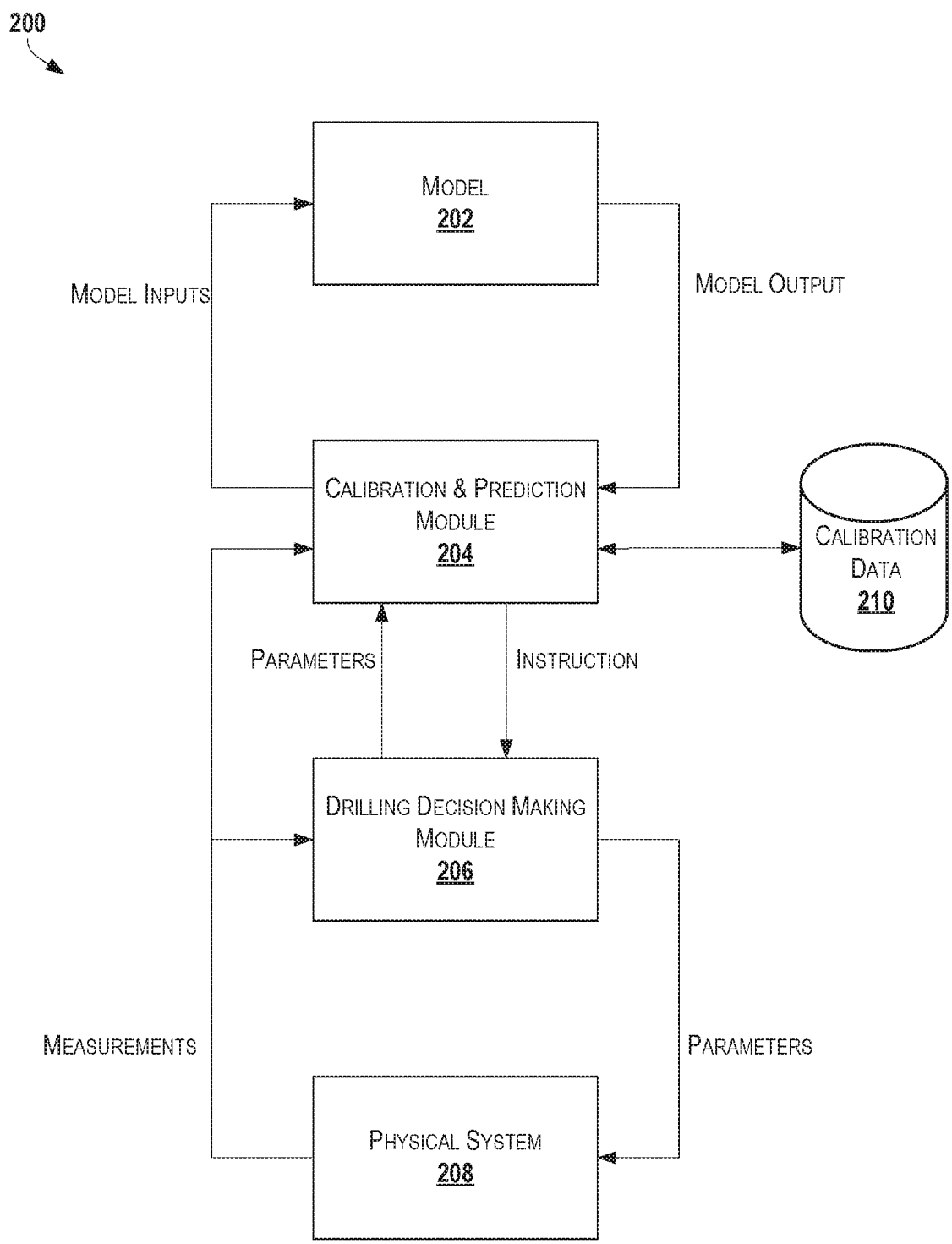
FIG. 2 is a functional block diagram of an automatic vibrational mapping system coupled to a physical system according to certain aspects of the present disclosure.

FIG. 2 is a functional block diagram of an automatic vibrational mapping system 200 coupled to a physical system 208 according to certain aspects of the present disclosure. The automatic vibrational mapping system 200 can include several modules, each of which can be embodied in one or more physical devices. The physical system 208 can include one or more devices or apparatuses associated with a drilling operation.

During a drilling operation, measurements are taken by sensors of the physical system 208. The measurements are representative of the vibration of the bottom hole assembly and the drill string. In some cases, measurements may also include measurements that are representative of the operational parameters, such as to provide feedback that the physical system 208 is operating using the provided operational parameters.

A drilling decision making module 206 can provide drilling parameters (e.g., operational parameters) to the physical system 208. The drilling decision making module 206 can be known as a drilling control module. In some cases, the drilling decision making module 206 contains some logic that updates the operational parameters in response to received measurements. The drilling decision making module 206 can provide the calibration and prediction module 204 with the operational parameters and optionally other data related to the drilling operation. The drilling decision making module 206 can receive instructions from the calibration and prediction module 204 to update the operational parameters the drilling decision making module 206 provides to the physical system 208. Thus, based on instructions from the calibration and prediction module 204, the operational parameters of the physical system 208 can be adjusted as desired via the drilling decision making module 206.

The calibration and prediction module 204 can interact with the model 202 to determine an estimated vibrational intensity based on given operational parameters. The calibration and prediction module 204 can receive sensed vibrational intensity from the physical system 208 or the drilling decision making module 206 and generate calibration data 210 based on a comparison of the estimated vibrational intensity and the sensed vibrational intensity. Calibration data 210 can include any adjustments or information used by the calibration and prediction module 204 or the mathematical model 202 to improve the accuracy of the estimated vibrational intensity. The calibration and prediction module 204 can obtain estimated vibrational intensity measurements for proposed operational parameters to determine a desirable new set of operational parameters (e.g., a new set of operational parameters that would minimize vibrational intensity), which can be provided as instructions to the drilling decision making module 206. Upon receiving the instructions, the drilling decision making module 206 can provide the new operational parameters to the physical system 208.

The mathematical model 202 can be any suitable model for providing an estimated vibrational intensity (e.g., model output) from given operational parameters (e.g., model inputs). In some cases, the model 202 can be based on a characterization map, such as a vibrational map.

The automatic vibrational mapping system 200 can be used to decide future drilling operation changes (e.g., updates to operational parameters) according to desired criteria. Proposed operational parameters can be used to predict results (e.g., estimated vibrational intensity). Depending on the active criteria (e.g., selected criteria), the proposed operational parameters can be used if the predicted results support the active criteria (e.g., smaller vibrational intensity), or discarded if the predicted results hinder the active criteria (e.g., increased vibrational intensity).

In some cases, the desired criteria can include minimizing vibrations. In other cases, the desired criteria can include characterizing the vibrational intensity in a larger operation range. Another criterion would be to optimize the drilling performance while ensuring that the vibrational intensity remains within an acceptable range. Other criteria can be used. In some cases, the active criteria can be switched or changed based on the demand of the drilling operation. In some cases, the active criteria can be switched or changed during a drilling operation or between drilling operations.

Figure 3:
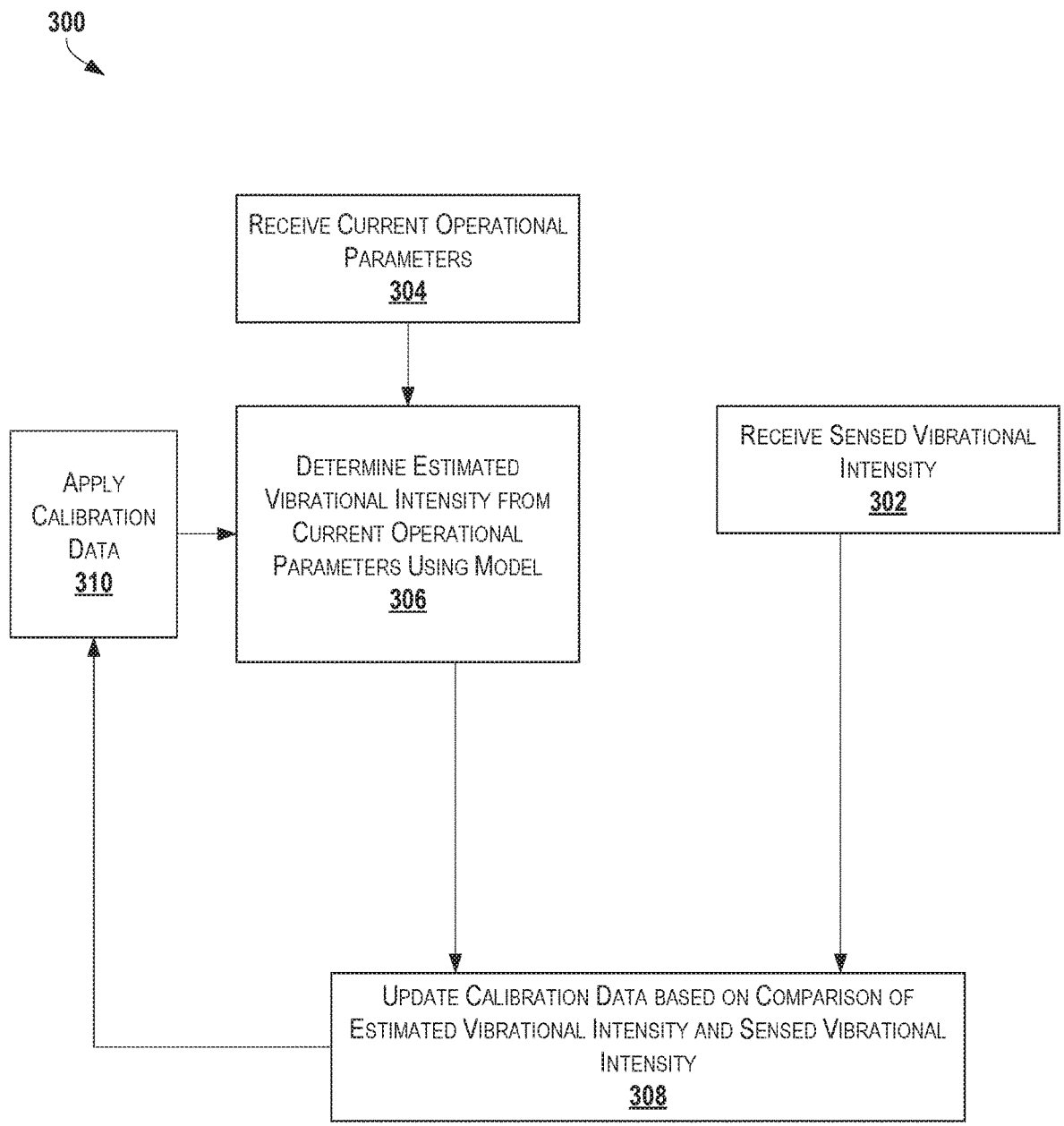
FIG. 3 is a flowchart diagram depicting a process of calibrating a mathematical model according to certain aspects of the present disclosure.

FIG. 3 is a flowchart diagram depicting a process 300 of calibrating a mathematical model according to certain aspects of the present disclosure. The process 300 can be used to calibrate the mathematical model 202 of FIG. 2. Process 300 can be performed by one or more modules of the automatic vibrational mapping system, including a calibration and prediction module.

At block 304, current operational parameters are received. The current operational parameters can be received from a drilling decision making module (e.g., drilling decision making module 206 of FIG. 2) or from the physical system itself (e.g., from sensors of the physical system). The operational parameters can include WOB, rotational speed of the drill string, mud circulation rate, or other parameters.

At block 306, an estimated vibrational intensity is determined from the current operational parameters using a model. The current operational parameters can be applied to a mathematical model, such as mathematical model 202 of FIG. 2, to calculate an estimated vibrational intensity. Determining the estimated vibrational intensity can optionally include applying existing calibration data at block 310.

At block 302, sensed vibrational intensity can be received. Sensed vibrational intensity can be received from a drilling decision making module (e.g., drilling decision making module 206 of FIG. 2) or from the physical system itself (e.g., from sensors of the physical system).

At block 308, the calibration data is updated based on a comparison of the estimated vibrational intensity determined at block 306 and the sensed vibrational intensity received at block 302. The comparison can include determining updated model settings to be applied to the mathematical model, which can be stored as calibration data.

Block 308 can include updating the calibration data to best fit the estimated vibrational intensity to the sensed vibrational intensity.

In some cases, block 308 includes determining whether the difference between the estimated vibrational intensity and the sensed vibrational intensity is greater than a minimum threshold amount. If the difference does not exceed the minimum threshold amount, the existing calibration data may be left unchanged.

By repeating the process 300, especially with different operational parameters, the mathematical model can be automatically calibrated. Process 300 can be repeated continuously, occasionally, or on-demand.

In some cases, estimated and sensed vibrational intensities from past sets of operational parameters, including the past sets of operational parameters themselves, can be stored as historical data. Historical data can be limited in size. In some cases, block 308 can include updating the calibration data to best fit the current and historical estimated vibrational intensities to the current and historical sensed vibrational intensities.

Figure 4:
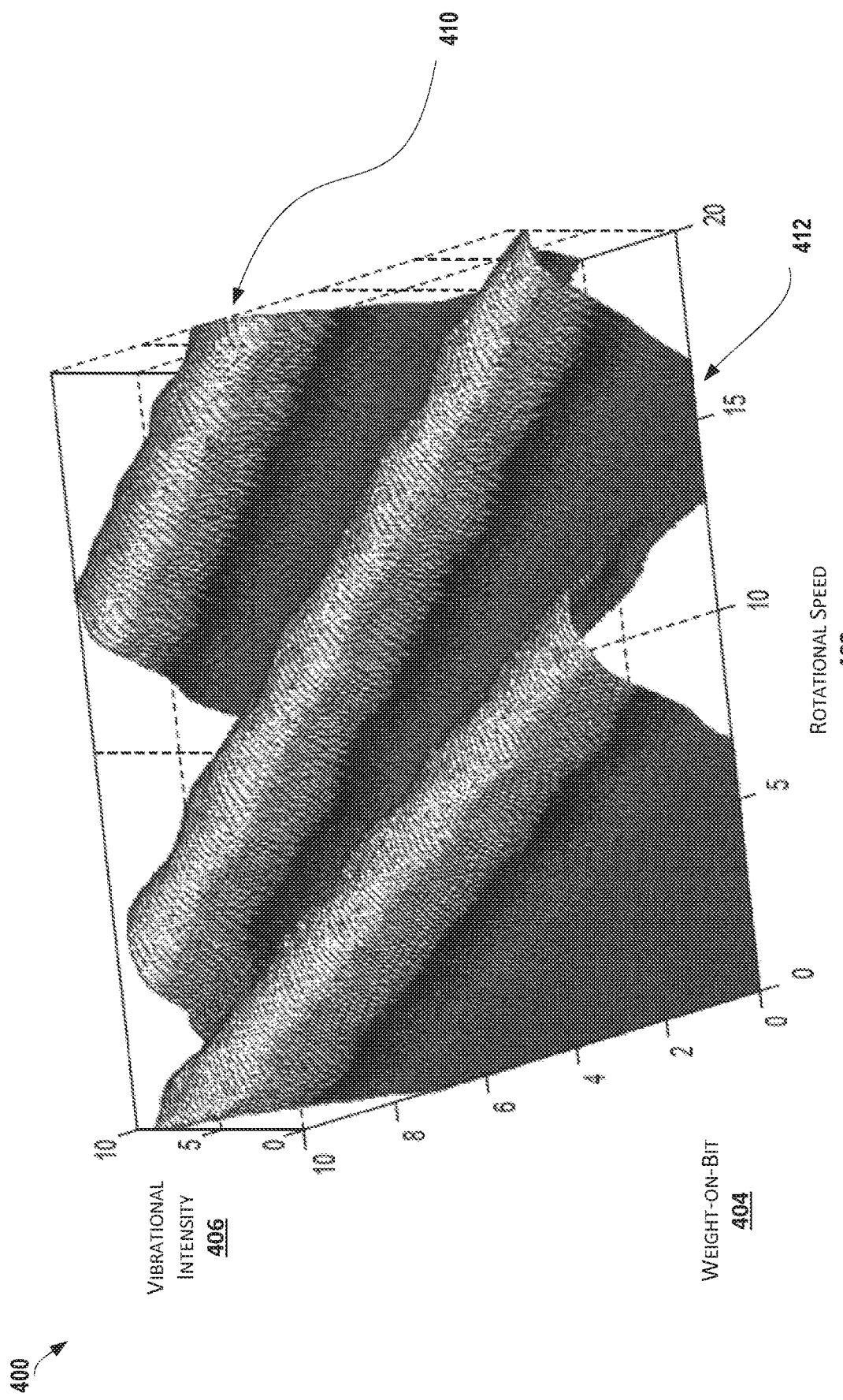
FIG. 4 is a three-dimensional vibration plot depicting vibrational intensity across a range of operational parameters according to certain aspects of the present disclosure.

FIG. 4 is a three-dimensional vibration plot 400 depicting vibrational intensity across a range of operational parameters according to certain aspects of the present disclosure. The plot 400 depicts how changes in rotational speed 402 and weight-on-bit 404 effect vibrational intensity 406. Plot 400 is a type of vibrational map that can be generated using the techniques disclosed herein. The plot 400 can extend through the full operational ranges of the operational parameters. Plot 400 can be considered a gradient of vibrational intensity.

Vibrational intensity (e.g., vibrational severity) can be a scalar value defined in different ways. For example, vibrational intensity (Vib) can be defined by the formula of Equation 1, where $x_i$, $y_i$, and $z_i$ are the Cartesian coordinate of point i at a certain location on the BHA or drill string. The plot of Vib in the weight-on-bit and rotational speed domain is depicted at vibration plot 400.

$$Vib = \frac{1}{T}\sum_{i=1}^{N}\int_{t-T}^{t} w_i f(x_i(\tau), y_i(\tau), z_i(\tau), \dot{x}_i(\tau), \dot{y}_i(\tau), \dot{z}_i(\tau), \ddot{x}_i(\tau), \ddot{y}_i(\tau), \ddot{z}_i(\tau))d\tau \quad \text{Equation 1}$$

Plot 400 can include peaks 410 and valleys 412. At or near the peaks 410, vibrational intensity 406 can be high. High vibrational intensity 406 can occur due to many reasons, including the rotational speed causing an excitation load on the BHA and drill string that matches certain resonance frequencies of the BHA or drill string. When weight-on-bit increases, the axial forces inside the BHA and drill string change, which can change the resonant frequencies of the BHA and drill string. Additionally, the resonant frequencies of the BHA and drill string can change based on their interactions with the particular formation in which they are used. Thus, the peaks 410 and valleys 412 of a particular plot 400 can change from operation to operation.

In some cases, vibrational intensity 406 can become too high to mitigate using standard practices. At or near the valleys 412, vibrational intensity 406 may be low. It may be desirable to perform a drilling operation within the valleys 412 to avoid undesirable vibrations. The plot 400 may be considered complex, having multiple peaks 410 and valleys 412 throughout the operational ranges of the operational parameters. Due to this complexity, adjusting one or more operational parameters in a given direction (e.g., increasing weight-on-bit 404) may not always produce the same changes in vibrational intensity 406. Therefore, knowledge of the plot 400 can help determine how one or more of the operational parameters must be adjusted to result in the desired change in vibrational intensity 406.

Figure 5:
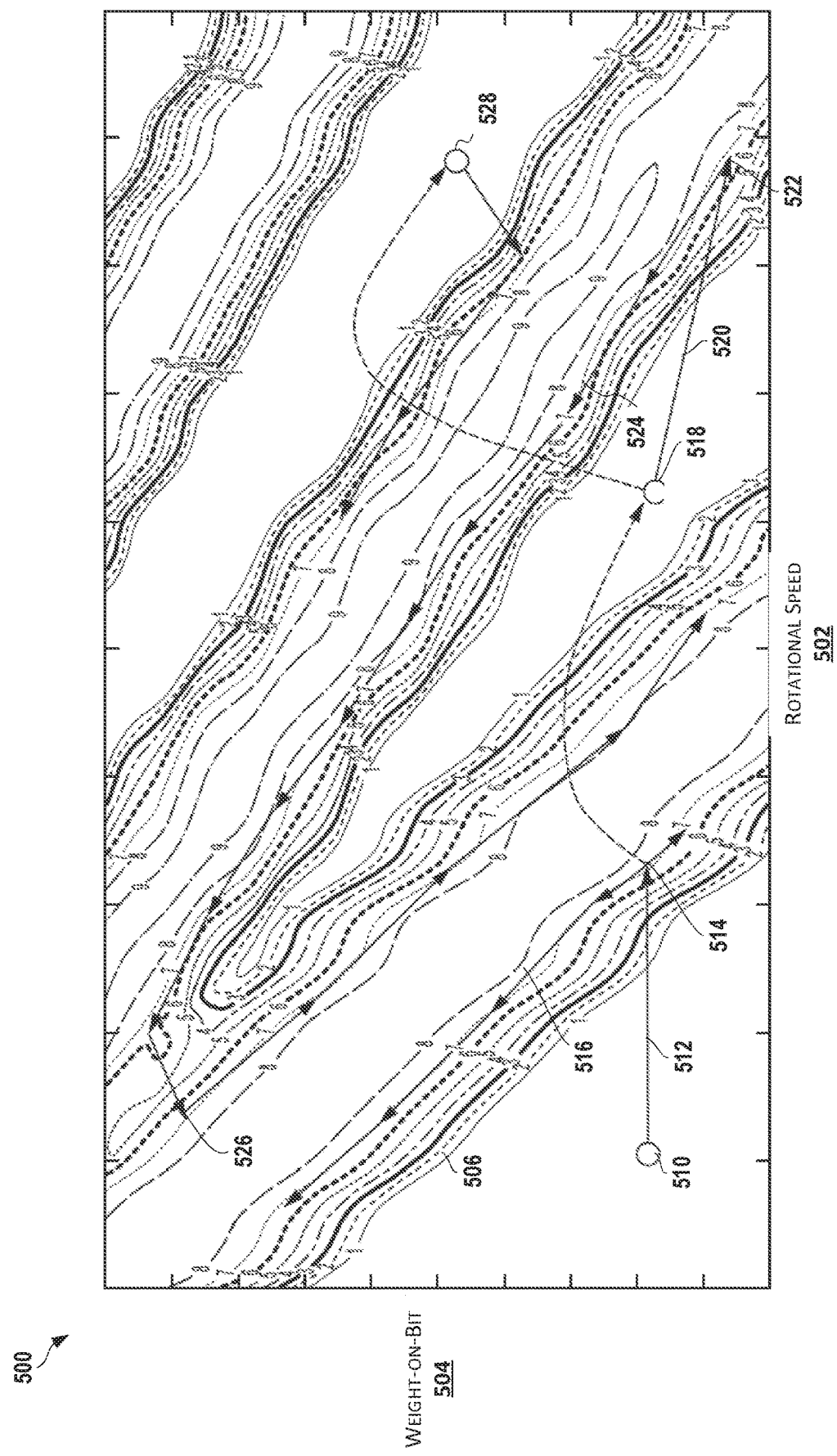
FIG. 5 is a contour plot depicting vibrational intensity across a range of operational parameters according to certain aspects of the present disclosure.

FIG. 5 is a contour plot 500 depicting vibrational intensity across a range of operational parameters according to certain aspects of the present disclosure. The contour plot 500 includes a set of contour lines 506 in a field defined by two operational parameters, weight-on-bit 504 and rotational speed 502. Each contour line 506 represents locations on the contour plot 500 where the vibrational intensity is constant for the given operational parameters. These contour lines 506 are unknown to a driller during the beginning of an operation. An experienced driller may know a reasonable operation point (e.g., coordinate of operational parameters) to use as a start point, however it remains unknown how to adjust that coordinate to improve drilling performance.

The contour plot 500 can include any number of contour lines 506. As seen in FIG. 5, contour lines 506 are depicted for vibrational level integers from 1 through 9 (e.g., a dimensionless representation of low to high vibrational levels). The contour plot 500 may or may not include dimensions for one or all of the operational parameters and vibrational intensity. In some cases, the contour plot 500 may include relative dimensions (e.g., 0-100% of the operational range) for each operational parameter.

The contour plot 500 can be a vibrational map of a modeled drilling operation or a live drilling operation.

Figure 6:
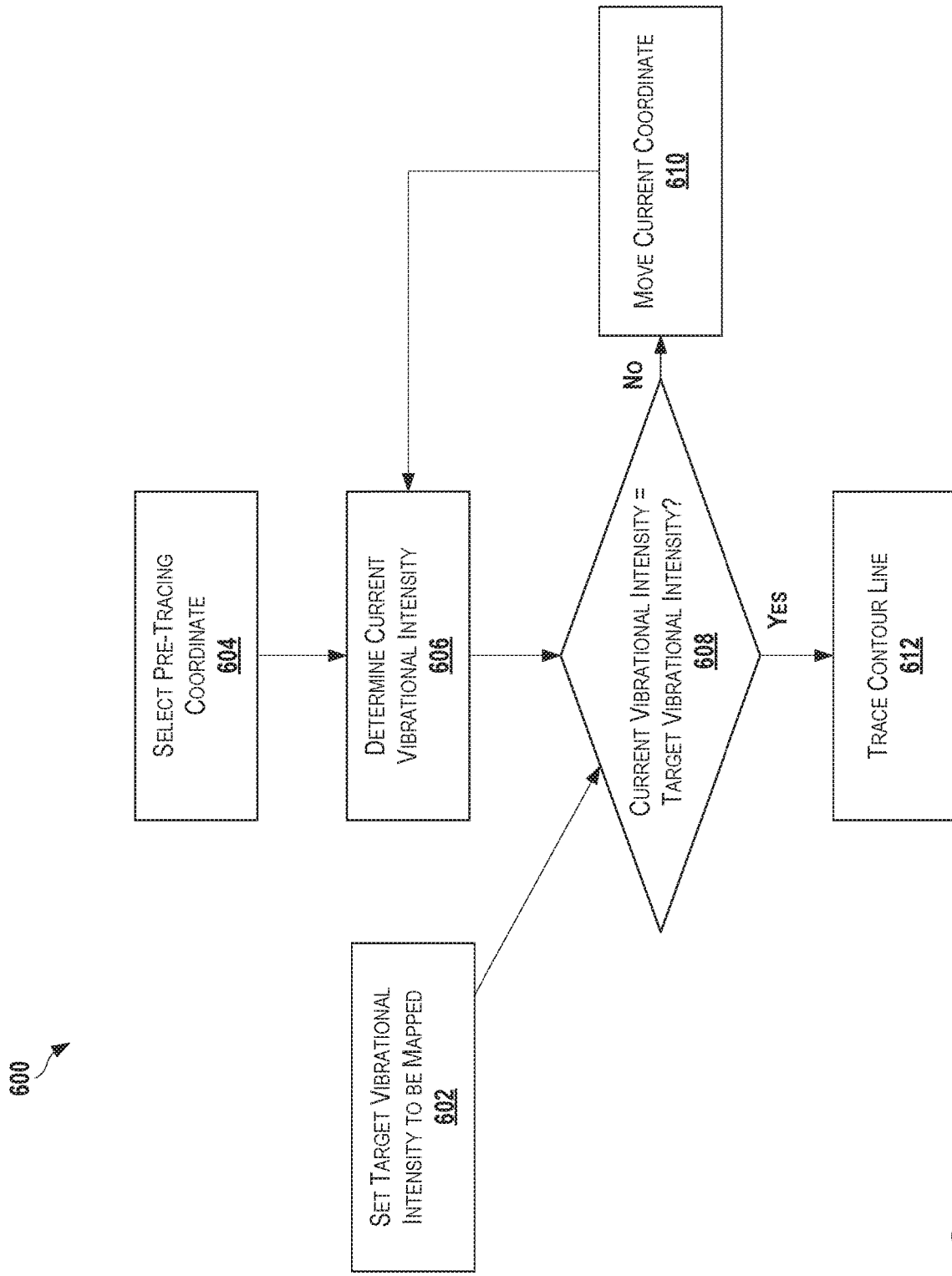
FIG. 6 is a flowchart depicting a process for tracing the contour plot of FIG. 5 according to certain aspects of the present disclosure.

FIG. 6 is a flowchart depicting a process 600 for tracing the contour plot 500 of FIG. 5. Process 600 can be performed through computer modeling or through data collection in a live drilling operation. Therefore, the various blocks described herein with relation to setting and retrieving data can refer either to inputting and retrieving data to and from a computer model or setting and retrieving data on a live drilling operation (e.g., by sending or receiving signals from drawworks, a top drive, a vibration sensor, a weight sensor, or other equipment). In some cases, even when characterizing a live drilling operation, a mathematical model can be used to estimate operational parameters to use when characterizing the live physical system. In some cases, process 600 can be proceeded by calibration of the model based on one or more measurements of the live physical system (e.g., by comparing the live vibrational intensities measured for one or more sets of operational parameters to those estimated by the mathematical model).

Referring to FIGS. 5 and 6, at block 602, a vibrational intensity to be mapped is selected as the target vibrational intensity. The vibrational intensity to be mapped can be an actual value or a relative value. The vibrational intensity to be mapped may correspond to a contour line 506 to be produced on the plot 500.

At block 604, a pre-tracing coordinate 510 can be selected. The pre-tracing coordinate 510 can be a coordinate having an initial weight-on-bit value and an initial rotational speed value. In some cases, the pre-tracing coordinate 510 is selected to be in a zone where vibrational intensity is expected or known to be low (e.g., starting at a relatively low weight-on-bit and relatively low rotational speed). For example, the pre-tracing coordinate 510 can be selected by an experienced driller or can be selected using an estimate based on historical data. In some cases, the pre-tracing coordinate 510 is selected randomly or pseudo-randomly.

At block 606, the vibrational intensity of the current coordinate is determined. As described above, the vibrational intensity can be determined by processing a computer model or by measuring or inferring vibrational intensity from sensors used in a live drilling operation.

At block 608, the current vibrational intensity is compared to the target vibrational intensity. If the current vibrational intensity is not equal to the target vibrational intensity, the operational parameters are adjusted at block 610 to move the current coordinate. If the current vibrational intensity is equal to the target vibrational intensity, the contour line is traced at block 612. In some cases, the evaluation at block 608 can include a margin of error to accommodate for vibrational intensity levels that are not exactly equal, but sufficiently equal. For example, a margin of error can be at or approximately 1%, 2%, 3%, 4%, 5%, 6%, 7%, 8%, 9%, 10%, or otherwise.

The current coordinate can be moved at block 610 by adjusting one or more of the operational parameters. The adjustment to the one or more operational parameters can be random, pseudo-random, or selected based on an expected result (e.g., a movement likely to increase the current vibrational intensity if the target vibrational intensity is higher than the current vibrational intensity). In some cases, the movement at block 610 can be selected, based on a mathematical model, to be a point predicted to have a vibrational intensity at or approximately equal to the target vibrational intensity. If the mathematical model is sufficiently calibrated and the physical system behaves sufficiently closely to the model's prediction, the movement at block 610 may not need to be iterated. The movement in block 610 can be iterated in some cases to obtain a close or accurate result.

In some cases, movement of the current coordinate at block 610 can include iterative adjustment to the one or more operational parameters through multiple iterations of block 610, with the adjustments occurring in the same direction (e.g., positive or negative) as performed in a previous iteration of block 610. After moving the current coordinate at block 610, the vibrational intensity for the new current coordinate can be determined at block 606 and compared to the target vibrational intensity at block 608. This loop of determining the current vibrational intensity at block 606, comparing it at block 608, and moving the current coordinate at block 610 can repeat until the current vibrational intensity reaches the target vibrational intensity and the process continues at block 612, until a predetermined time limit is reached, or until threshold values are reached for the operational parameters (e.g., operational bounds). As described above, at least one of the operational parameters of the current coordinate can be adjusted in a constant direction through sequential iterations of block 610, thus moving the current coordinate in a generally constant direction with respect to at least one of the operational parameters. Examples can include moving in a straight line (e.g., horizontal, vertical, or diagonal) or moving in a curve (e.g., sinusoidal or parabolic) where at least one of the operational parameters is increasing or decreasing. By moving the current coordinate in this manner, there may be a sufficiently high likelihood of intercepting a desired contour line 506. However, in some cases, the current coordinate may be moved at block 610 in other ways that do not always result in an increasing or decreasing operational parameter.

Path 512 is one example of the result of iterations of block 610, where the pre-tracing coordinate 510 was moved with the weight-on-bit 504 remained constant and the rotational speed 502 increased until the tracing start coordinate 514 has been reached, at which point the evaluation at block 608 indicated that the then-current vibrational intensity matched the target vibrational intensity and tracing began at block 612. Path 512 may have occurred through multiple iterations of block 610 or a single iteration of block 610.

At block 612, the tracing process can be generated by adjusting the current coordinate while maintaining a constant vibrational intensity, as disclosed in further detail herein. The current coordinate can be adjusted incrementally to create a traced path 516. The traced path 516 can define a contour line 506 of the plot 500. Tracing at block 612 can continue until a sufficient the current coordinate that is being traced meets the tracing start coordinate 514 (e.g., indicative of a contour line 506 in the shape of a closed loop) or until at least one of the operational parameters reaches the end of its operational boundaries. Other stop conditions can be used. In some cases, the tracing process at block 612 can include returning to the tracing start coordinate 514 and tracing the contour line in a different direction (e.g., an opposite direction).

Process 600 can be repeated to determine contour lines 506 for different target vibrational intensities or to determine contour lines 506 occurring in other regions of the plot 500 for an already-mapped target vibrational intensity.

To trace contour lines 506 for different target vibrational intensities, process 600 can be repeated with an new target vibrational intensity set at block 602. In some cases, the pre-tracing coordinate set at block 604 can be the same as in previous iterations of process 600, although a new pre-tracing coordinate can be used. For example, the contour lines 506 depicted in FIG. 5, which show relative vibrational intensities in integer increments from "1" to "9," can be determined by repeating process 600 at least once for each of the integer increments from "1" to "9."

To trace contour lines 506 located in different regions of the plot 500, the process 600 can be repeated with new or already-used target vibrational intensities set at block 602, but with a new pre-tracing coordinate set at block 604. The location of the new pre-tracing coordinate can be set randomly, pseudo-randomly, or based on an expected useful location (e.g., based on a prediction from the mathematical model). For example, the new pre-tracing coordinate (e.g., pre-tracing coordinate 518) can be set to a location on the opposite side of a previously traced contour line (e.g., traced path 516) for the current target vibrational intensity from the previous pre-tracing coordinate (e.g., pre-tracing coordinate 510) used to determine the previously traced contour line. In such an example, the process 600 can continue with the current coordinate being moved along path 520 until a starting coordinate 522 is reached, at which point tracing begins at block 610 to determine the traced path 524. As shown with respect to traced path 524, in some cases, when operational bounds for at least one of the operational parameters is approached, the tracing process at block 610 can attempt to locate a nearby contour line that is sufficiently close to the current coordinate, and continue tracing from that location. As seen in FIG. 5, the traced path 524, upon reaching the upper bounds of the weight-on-bit 504 operational parameter, identified a new coordinate 526 that had the same vibrational intensity (e.g., a relative intensity of "7") and continued tracing from the new coordinate 526.

Additionally, FIG. 5 depicts process 600 occurring from yet another pre-tracing coordinate 528. If, during an iteration of process 600, the target vibrational intensity meets the current vibrational intensity, as evaluated at block 608, at a coordinate that already falls on a traced path (e.g., traced path 516), the process 600 can end without re-tracing the path or can attempt to find a new path by returning to the pre-tracing coordinate and moving the current coordinate in a new direction.

The process 600 can occur at least once each desired target vibrational intensity. In some cases, the process 600 can occur multiple times for each desired target vibrational intensity until a level of confidence is achieved that the plot 500 is fully or sufficiently mapped. The level of confidence can be based on an expectation (e.g., an expected contour plot estimation derived from historical data), a percentage of the plot 500 that has been filled with traced paths, the number of traced paths found per vibrational intensity, or other metrics.

In some cases, especially when characterizing vibrational intensities of a live physical system, it may be desirable to use low or moderate levels of vibrational intensity as target vibrational intensities during process 600. The use of low or moderate levels of vibrational intensity can help avoid damage or other undesirable effects of high levels of vibrational intensity. The higher levels of vibrational intensity can be estimated or characterized using the mathematical model. The higher levels of vibrational intensity can be even more accurately estimated or characterized using the mathematical model as calibrated based on the already-characterized vibrational characteristics of the live system for the low to moderate vibrational intensity levels.

Figure 7:
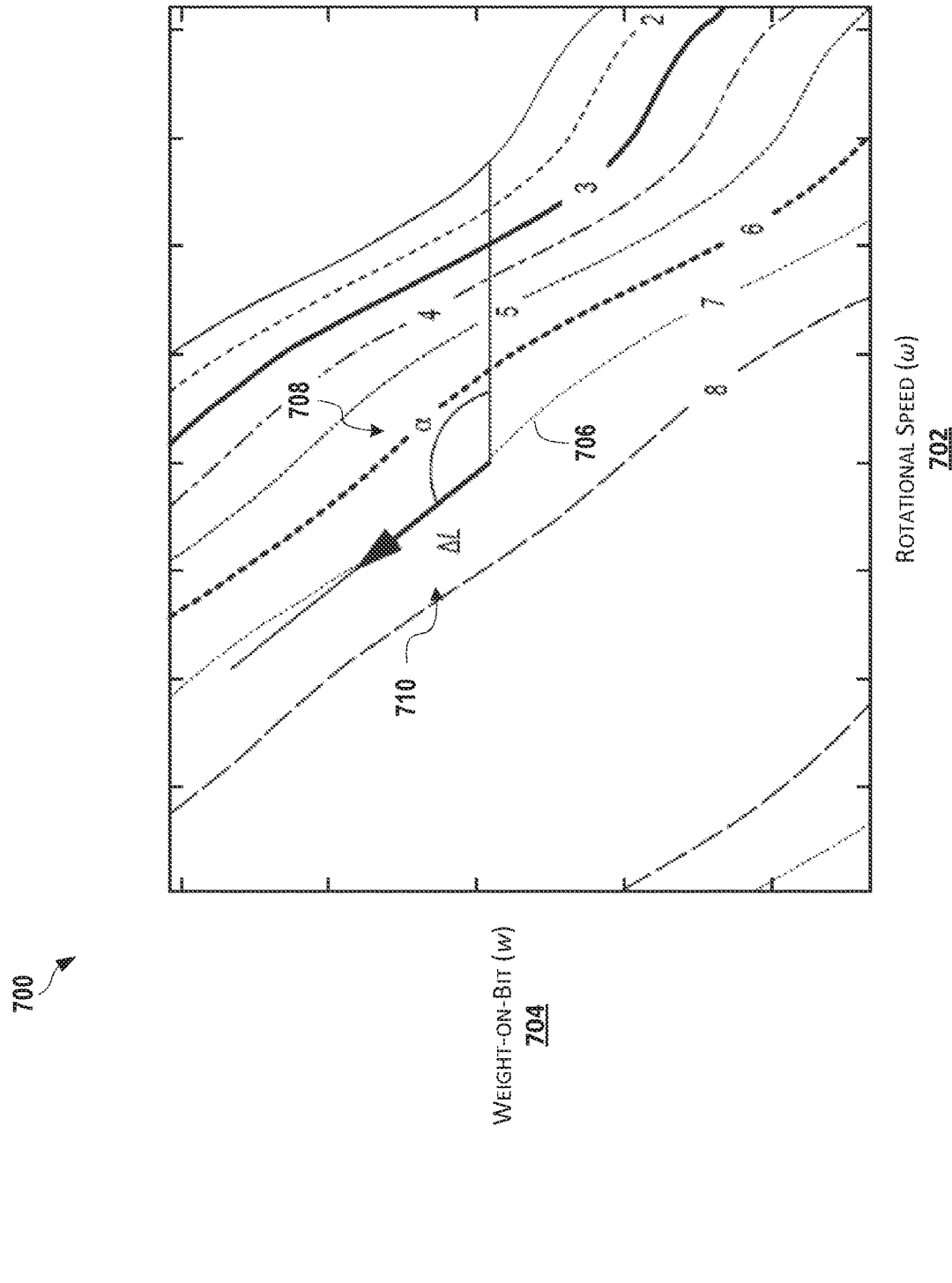
FIG. 7 is a close-up view of a portion of a contour plot depicting vibrational intensity across a range of operational parameters according to certain aspects of the present disclosure.

FIG. 7 is a close-up view of a portion of a contour plot 700 depicting vibrational intensity across a range of operational parameters according to certain aspects of the present disclosure. The operational parameters are weight-on-bit 704 and rotational speed 702. The notations on the contour plot 700 of FIG. 7 depict generally how the contour line 706 is traced. Tracing a contour line can be performed in various ways, including as described below.

The vibrational intensity (e.g., as predicted by the mathematical model) can be written as the function $V(\omega, w)$ be, where $\omega$ is the rotational speed (e.g., angular velocity) and w is the weight-on-bit. The coordinate $(\omega_0, w_0)$ can be the current operational point (e.g., the tracing start coordinate) and $V_0 = V(\omega_0, w_0)$ can be the current vibration severity. Therefore, the contour line for that particular vibrational intensity (e.g., where the target vibrational intensity to be mapped is $V_0$) can be described as $V(\omega, w) = V_0$. Since the goal of tracing the contour line is to keep vibrational intensity constant, the partial differential equation shown in Equation 2 can be used. Equation 2 represents the relationship between the step change of weight-on-bit and the step change of rotational speed needed to maintain constant vibrational intensity.

$$dV = \frac{\partial V}{\partial \omega} d\omega + \frac{\partial V}{\partial \omega} dw = 0 \quad \text{Equation 2}$$

The relationship between the step change of the rotational speed and the step change of the weight-on-bit can also be expressed as shown in Equation 3, where $\alpha$ is the angle 708 shown in FIG. 7.

$$\frac{\partial w}{\partial \omega} = -\frac{\frac{\partial V}{\partial \omega}}{\frac{\partial V}{\partial \omega}}\bigg|_{(\omega_0, w_0)} = \tan\alpha \quad \text{Equation 3}$$

It should be noted that when $$\left.\frac{\partial V}{\partial w}\right|_{(\omega_0, w_0)} = 0,$$

tan α is not wen defined. In such a case, then $$\alpha = \frac{\pi}{2} \text{ if } \frac{\partial V}{\partial w} < 0, \text{ and } \alpha = \frac{\pi}{2} \text{ if } \frac{\partial V}{\partial \omega} > 0.$$

To trace the contour line, a subsequent coordinate (e.g., drilling operation point still on the contour line) can be determined based on a selected arc length change dL (e.g., arc length change 710) using the formulae of Equations 4 and 5 to track the contour line $V(\omega,w)=V_0$.

$$\Delta\omega = \Delta L \cos \alpha \quad \text{Equation 4}$$

$$\Delta w = \Delta L \sin \alpha \quad \text{Equation 5}$$

In some cases, contour line $V(\omega, w)=V_1$ may be traced from an initial coordinate $(\omega_0, w_0)$. A coordinate on contour line $V(\omega, w)=V_1$ can be determined using Equations 6 and 7, wherein $\omega_1=\omega_0+\Delta\omega$ and $w_1=w_0+\Delta w$.

$$\Delta\omega = (V_1 - V_0) \frac{\frac{\partial V}{\partial \omega}}{\sqrt{\left(\frac{\partial V}{\partial \omega}\right)^2 + \left(\frac{\partial V}{\partial \omega}\right)^2}}\bigg|_{\omega_0, w_0} \quad \text{Equation 6}$$

$$\Delta w = (V_1 - V_0) \frac{\frac{\partial V}{\partial w}}{\sqrt{\left(\frac{\partial V}{\partial \omega}\right)^2 + \left(\frac{\partial V}{\partial w}\right)^2}}\bigg|_{\omega_0, w_0} \quad \text{Equation 7}$$

In some cases, a coordinate on contour line $V(\omega, w)=V_1$ can be determined using Equations 8 and 9, wherein $\omega_1=\omega_0+\Delta\omega$, $w_1=w_0+\Delta w$, and k is a real number.

$$\Delta\omega = (V_1 - V_0) \frac{1}{\frac{\partial V}{\partial \omega} + k\frac{\partial V}{\partial w}}\bigg|_{\omega_0, w_0} \quad \text{Equation 8}$$

$$\Delta w = (V_1 - V_0) \frac{k}{\frac{\partial V}{\partial \omega} + k\frac{\partial V}{\partial w}}\bigg|_{\omega_0, w_0} \quad \text{Equation 9}$$

Once the coordinate on contour line $V(\omega, w)=V_1$ has been determined, the contour line can be traced as described above with reference to contour line $V(\omega, w)=V_0$.

As described herein, the various aspects and features of the present disclosure can be used for cost functions other than vibrational intensity to guide an operation such as a drilling operation. In an example, $J(\omega, w)$ can be the function to be mapped in a drilling process (e.g., mud usage, rate of penetration, operational cost, drill bit wear, or others). Given a current coordinate $(\omega_0, w_0)$, the next coordinate can be determined by Equations 10 and 11, wherein $\omega_1=\omega_0+\Delta\omega$, $w_1=w_0+\Delta w$, and $\Delta S=J_1-J_0$.

$$\Delta\omega = \Delta S \frac{\frac{\partial J}{\partial \omega}}{\sqrt{\left(\frac{\partial J}{\partial \omega}\right)^2 + \left(\frac{\partial J}{\partial \omega}\right)^2}}\bigg|_{\omega_0, w_0} \quad \text{Equation 10}$$

$$\Delta w = \Delta S \frac{\frac{\partial J}{\partial w}}{\sqrt{\left(\frac{\partial J}{\partial \omega}\right)^2 + \left(\frac{\partial J}{\partial w}\right)^2}}\bigg|_{\omega_0, w_0} \quad \text{Equation 11}$$

The disclosure related to Equations 2-11 describe certain approaches to tracing contour lines, including determining tracing start coordinates, following contour lines, and determining new tracing start coordinates from existing coordinates. Other optimization methods can be used to trace coordinates or to optimize any suitable cost functions. In some cases, constraints of the drilling operation can be used and a constrained optimization method can be used.

Figure 8:
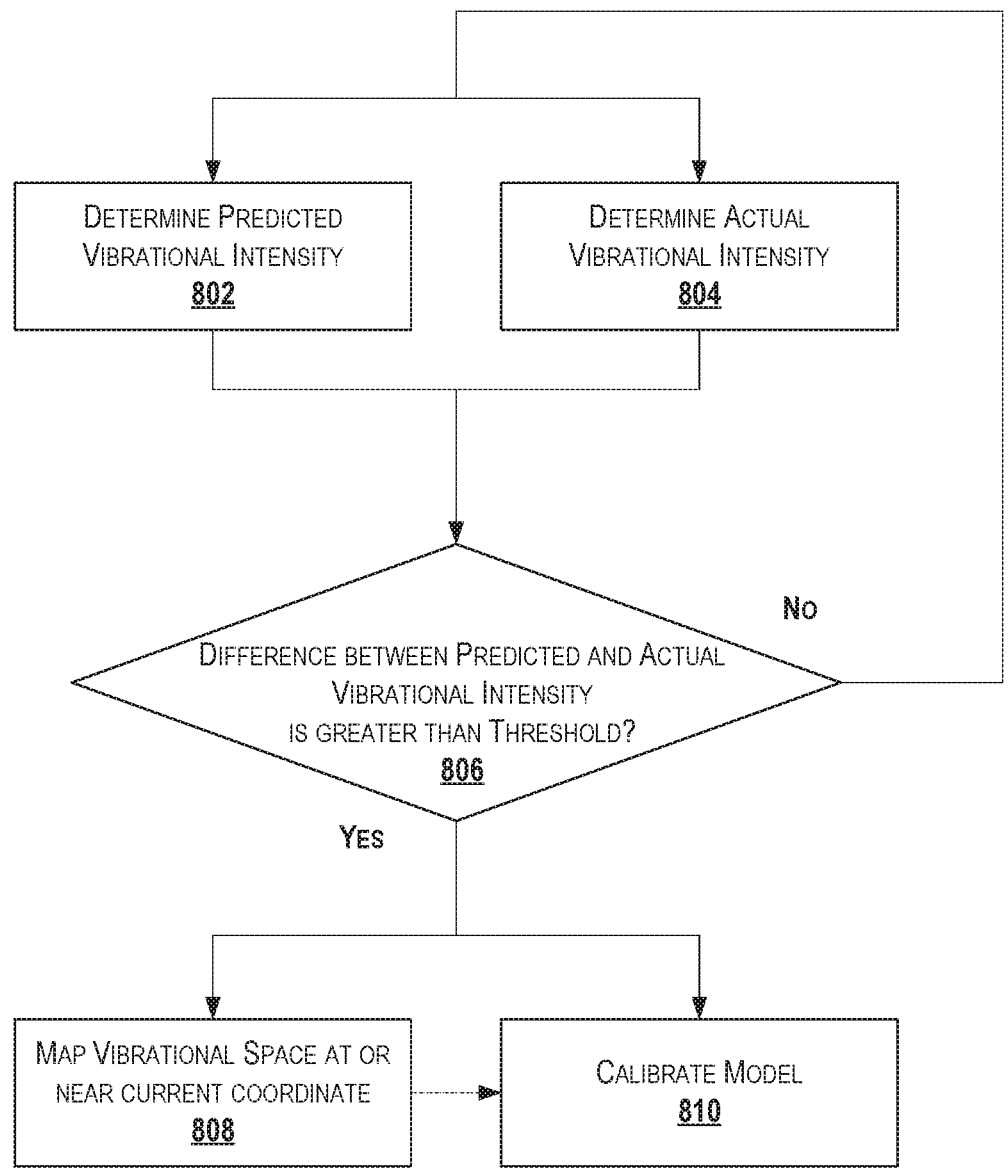
FIG. 8 is a flowchart depicting a process for automatically mapping relevant vibrational spaces according to certain aspects of the present disclosure.

FIG. 8 is a flowchart depicting a process 800 for automatically mapping relevant vibrational spaces according to certain aspects of the present disclosure. In some cases, mapping an entire vibrational space (e.g., within the full operational bounds of the operational parameters) can be unnecessary or undesirable. In some cases, only the relevant vibrational space may be mapped. The relevant vibrational space can be the region in which the probability of the system operating with operational parameters falling in that region is highest. The following examples can be used to automatically start and stop vibration space mapping during drilling operations to map only relevant vibrational spaces.

Process 800 automatically uses a model to predict subsequent operational coordinates whenever the model is determined to be sufficiently accurate and automatically recalibrates the model based on actual measurements if the model is determined to be inaccurate. Recalibration can be based on actual measurements or newly determined contour plots.

At block 802, the predicted vibrational intensity can be determined based on a model. $\tilde{\xi}(x_c)$ can represent the vibrational intensity predicted by the mathematical model for the current coordinate $x_c$ (e.g., a certain coordinate of operational paramters). At block 804, the actual vibrational intensity of the physical system can be determined (e.g., using sensors). $\xi(x_c)$ can represent the actual vibrational intensity measured in the physical system for the current coordinate $x_c$.

At block 806, the predicted vibrational intensity and actual vibrational intensity can be compared to determine if the difference between the two values (e.g., an absolute value of the difference) exceeds a predefined threshold for model accuracy. If the threshold is exceeded, vibration mapping process can commence at block 808. Additionally, model calibration can commence at block 810 to update or otherwise calibrate the model based on the vibrational data that was mapped at block 808 or the actual vibrational intensity collected at block 804. For example, when $|\tilde{\xi}(x_c) - \xi(x_c)| > \epsilon$, where $\epsilon$ is the predefined threshold for model accuracy, the vibration mapping process (e.g., process 600) can commence to obtain (e.g., map) vibration data at or around coordinate $x_c$. The model can also be calibrated based on the vibrational data mapped at or around coordinate $x_c$ or based on the actual vibrational intensity $\xi(x_c)$ for that coordinate.

But, when the threshold is not exceeded at block 806, the process 800 can simply continue back at blocks 802 and 804 when a new current coordinate is used. For example, when $|\tilde{\xi}(x_c)-\xi(x_c)|\leq\epsilon$, any mapping of vibrational data or calibration of models can cease. Therefore, vibrational mapping may occur when the accuracy of the model's predicted vibrational intensity, as compared to actual measured vibrational intensity, is low.

Process 800 can be applied to avoid excessive vibrations, especially when transitioning from one operational point (e.g., coordinate) to another. For example, if the current coordinate is $x_c$, and the BHA model is represented as $\theta_c$, which predicts a vibrational intensity $\tilde{\xi}_\theta(x_c)$ that matches the actual, measured vibrational intensity (e.g., $\tilde{\xi}_\theta(<\tilde{\xi}(x_c))$). The system can optimize the drilling performance (e.g., rate of penetration or other) based on the BHA model $\theta_c$ and models of other components of the drilling system, and can indicate that the next operational coordinate should be $x_n$ for best system performance. When the drilling control system changes operational coordinates, the actual operational coordinates may change continuously due to the physics of the system, therefore the operational coordinates follows a certain path $x(s)=p(x_c,x_n,s)$, where $s_0 \leq s \leq s_f$ is the path length coordinate, $p(x_c,x_n,s_f)=x_c$, and $p(x_c,x_n,s_f)=x_n$, which can be an ideal case when the transition is accurate. $p(x_c,x_n, s_f)$ may be sufficiently close to $x_n$. The system can continuously predict the vibrational intensity for $s_0 \leq s \leq s_f$ using model $\theta_c$ and compare the predicted value with the measured vibrational intensity. If $|\tilde{\xi}(x(s))-\xi(x(s))|>\epsilon$, then the transition can be temporarily suspended and the system can begin mapping at or near $x(s)$ and can recalibrate the model $\theta_c$ until the vibrational intensity $|\tilde{\xi}(x(s))-\xi(x(s))|\leq\epsilon$ in a region containing $x(s)$. The system can then re-optimize drilling performance as described above and produce a new optimization point $x_{n'}$. The drilling control system can then begin transitioning to $x_{n'}$ while predicted and actual vibrational intensities are monitored.

Figure 9:
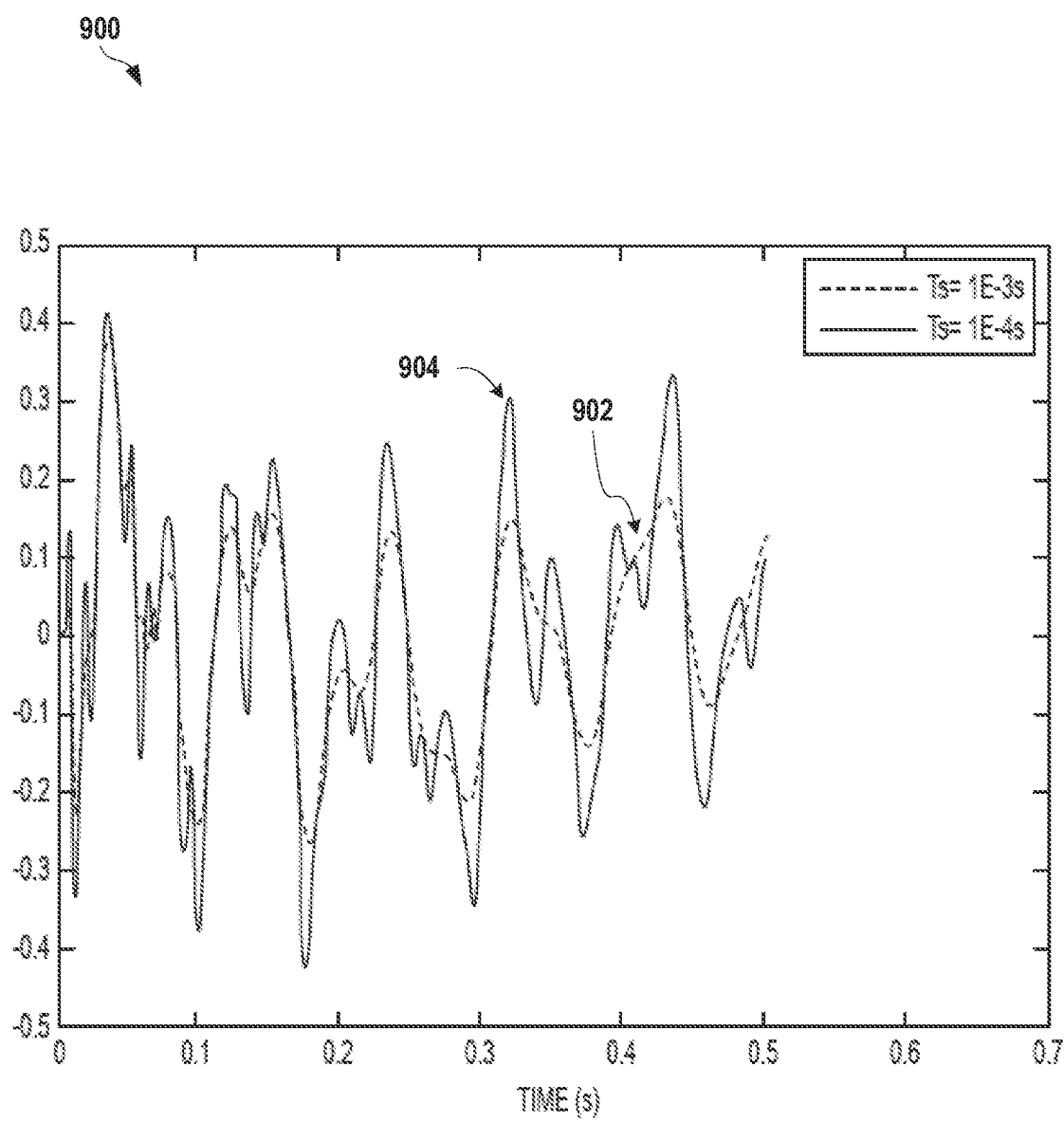
FIG. 9 is a graph depicting a prediction of lateral vibration of a BHA according to certain aspects of the present disclosure.

FIG. 9 is a graph 900 depicting lateral vibration of a BHA as predicted by Equations 12 and 13, according to certain aspects of the present disclosure. Various aspects of the present disclosure utilize one or more mathematical models to estimate vibrational intensity (e.g., of a BHA and drill string). Any suitable model for estimating vibrational intensity can be used. Suitable models can be data driven or physics based models.

In at least some cases, planar vibration of the BHA and drill string can be estimated using a model based on Timoshenko's beam theory. In some cases, the model can use the partial differential equations shown in Equations 12 and 13.

$$\frac{\partial^2 y}{\partial t^2} = -\frac{G_K}{\rho}\frac{\partial \psi}{\partial x} + \frac{G_K}{\rho}\frac{\partial^2 y}{\partial x^2} + \frac{1}{\rho A}q(x,t) \quad \text{Equation 12}$$

$$\frac{\partial^2 \psi}{\partial t^2} = \frac{GA_K}{\rho I}\frac{\partial y}{\partial x} - \frac{GA_K}{\rho I}\psi + \frac{E}{\rho}\frac{\partial^2 \psi}{\partial x^2} \quad \text{Equation 13}$$

In Equations 12 and 13, the variables can be defined as follows, where:
t is time;
y is the lateral displacement of a segment of the beam (e.g., BHA and drill string) at axial location x;
$\Psi$ is the rotation angle of the segment;
G is the shear stiffness of the beam;
A is the area of the cross section passing the point;
k is the shear coefficient;
$\rho$ is the density;
q is the distributed lateral load force (e.g., force that starts the excitation);
E is the Young's modulus; and
l is the moment of inertia of the cross section.

Depending on different boundary conditions and external load forces, Equations 12 and 13 can predict the vibrations of the beam (e.g., BHA and drill string).

Graph 900 is an example that shows lateral vibration of a BHA as predicted using Equations 12 and 13. Graph 900 plots two lines, line 902 and line 904, each representing the lateral vibrations as determined at different temporal resolutions (e.g., different time scales). $T_s$ is the length of the time step, where a smaller time step equates to a higher temporal resolution. Line 902 is shown with a time scale of $T_s=1E-3s$ and line 904 is shown with a time scale of $T_s=1E-4s$. In some cases, high frequency vibration modes can be better captured by using a higher temporal resolution.

The aspects and features disclosed herein can help characterize vibration during oilfield operations, such as drilling operations, and improve the operations based on preselected criteria. Unintended consequences (e.g., severe vibrations) from inappropriate operational parameters (e.g., drilling parameters) can be avoided, thus avoiding detrimental effects on the operation (e.g., by saving drilling equipment from damage or premature wear). The aspects and features disclosed here can be used to guide the drilling process and facilitate drilling automation. Information can also be provided to a driller to improve the driller's decision making process.

Figure 10:
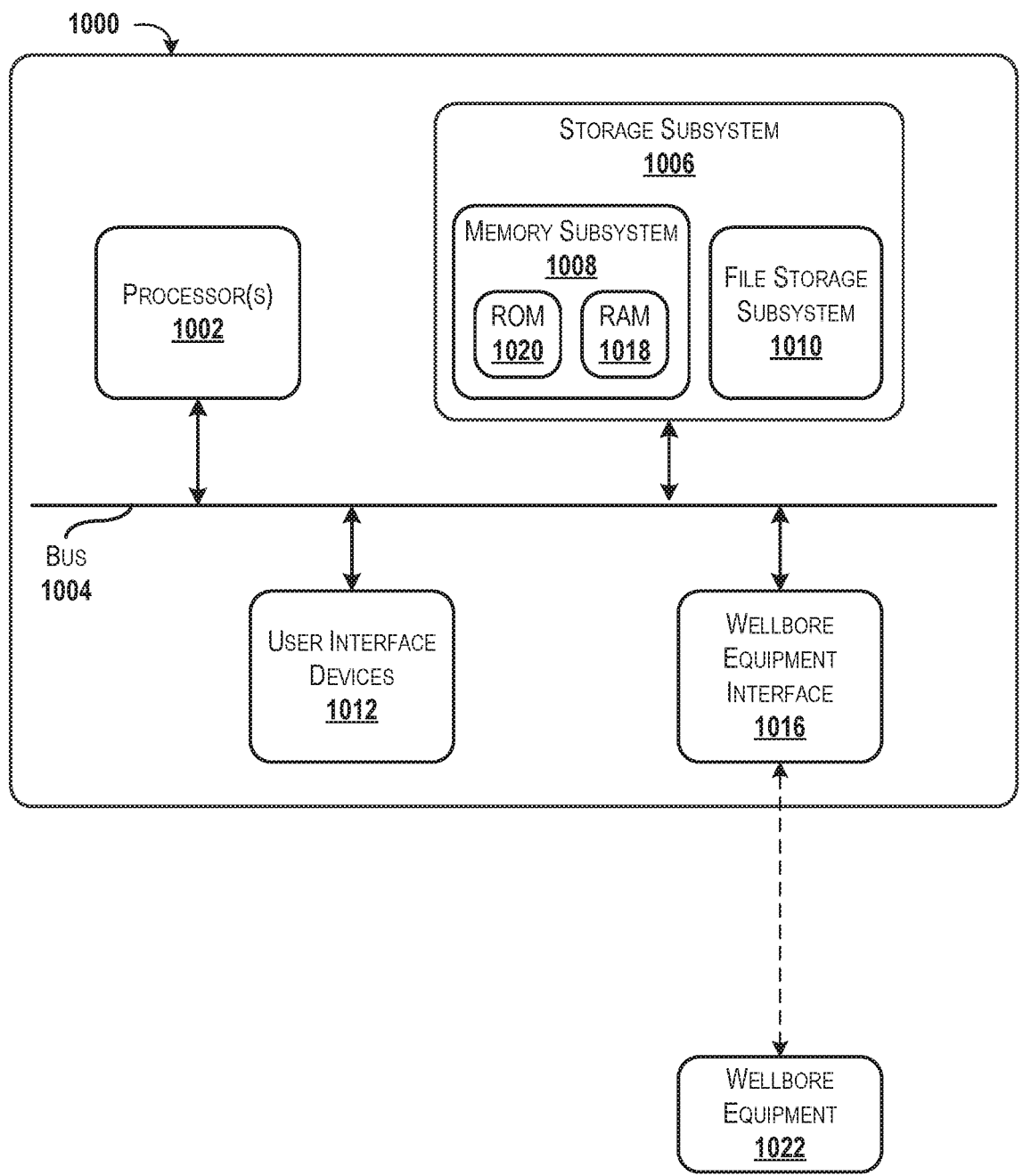
FIG. 10 is a block diagram depicting a control system that may incorporate components of various systems and devices described herein according to certain aspects of the present disclosure.

FIG. 10 is a block diagram depicting a control system 1000 that may incorporate components of various systems and devices described herein according to certain aspects of the present disclosure. For example, one or more of the mathematical model 202, calibration and prediction model 204, calibration data 210, and calibration drilling decision making module 206 of FIG. 2 can be embodied in the control system 1000. In some cases, a computing device can incorporate some or all of the components of control system 1000. Control system 1000 can include one or more processors 1002 that communicate with a number of peripheral subsystems via a bus subsystem 1004. These peripheral subsystems may include a storage subsystem 1006, including a memory subsystem 1008 and a file storage subsystem 1010, user interface devices 1012, and a wellbore equipment interface 1016.

Bus subsystem 1004 can provide a mechanism for allowing the various components and subsystems of control system 1000 communicate with each other as intended. Although bus subsystem 1004 is shown schematically as a single bus, in some cases, the bus subsystem may utilize multiple busses.

Processor 1002, which can be implemented as one or more integrated circuits (e.g., a conventional microprocessor or microcontroller), controls the operation of control system 1000. One or more processors 1002 may be provided. These processors may include single core or multicore processors. In some cases, processor 1002 can execute a variety of programs in response to program code and can maintain multiple concurrently executing programs or processes. At any given time, some or all of the program code to be executed can be resident in processor(s) 1002 and/or in storage subsystem 1006. Through suitable programming, processor(s) 1002 can provide various functionalities described above.

Wellbore equipment interface 1016 can provide an interface to wellbore equipment 1022 of the wellbore operation, such as a drilling system. The wellbore equipment 1022 can include equipment used to sense data from the wellbore operation or control the wellbore operation. Some examples of wellbore equipment 1022 include drawworks, a top drive, a mud circulation pump, and a vibration sensor. Wellbore equipment interface 1016 serves as an interface for sending and receiving control signals to and from equipment related to the wellbore operation. For example, wellbore equipment interface 1016 may enable control system 1000 to receive current operational parameter data from a drawworks, a top drive, or a sensor, as well as provide control signals to the drawworks and top drive to control the drilling operation (e.g., changing weight-on-bit or rotational speed). The wellbore equipment interface 1016 can interface with wellbore equipment through a wired or wireless connection. In some cases, the wellbore equipment interface 1016 can interface with intermediate equipment that in turn facilitates interfacing with the wellbore equipment.

User interface devices 1012 can include input and output devices. Examples of user interface devices 1012 that are input devices may include a keyboard, pointing devices such as a mouse or trackball, a touchpad or touch screen incorporated into a display, a scroll wheel, a click wheel, a dial, a button, a switch, a keypad, audio input devices such as voice recognition systems, microphones, eye gaze systems, and other types of input devices. In general, use of the term "input device" is intended to include all possible types of devices and mechanisms for inputting information to control system 1000. Examples of user interface devices 1012 that are output devices may include a display subsystem, indicator lights, or non-visual displays such as audio output devices, etc. The display subsystem may be a cathode ray tube (CRT), a flat-panel device such as a liquid crystal display (LCD), a projection device, a touch screen, and the like. In general, use of the term "output device" is intended to include all possible types of devices and mechanisms for outputting information from control system 1000.

Storage subsystem 1006 can provide a computer-readable storage medium for storing the basic programming and data constructs that provide the functionality of various aspects disclosed herein. Storage subsystem 1006 can be implemented, e.g., using disk, flash memory, or any other storage media in any combination, and can include volatile and/or non-volatile storage as desired. Storage subsystem 1006, or any of its components, can be non-transitory storage mediums. Software (programs, code modules, instructions), which when executed by a processor provide the functionality described above, may be stored in storage subsystem 1006. These software modules or instructions may be executed by processor(s) 1002. Storage subsystem 1006 may also provide a repository for storing data used in accordance with aspects of the present disclosure, such as models, vibration maps, and historical data. Storage subsystem 1006 may include memory subsystem 1008 and file/disk storage sub system 1010.

Memory subsystem 1008 may include a number of memories including a main random access memory (RAM) 1018 for storage of instructions and data during program execution and a read only memory (ROM) 1020 in which fixed instructions may be stored. File storage subsystem 1010 may provide persistent (non-volatile) memory storage for program and data files, and may include a hard disk drive, a floppy disk drive along with associated removable media, a Compact Disk Read Only Memory (CD-ROM) drive, an optical drive, removable media cartridges, and other like memory storage media.

Due to the ever-changing nature of computers and control systems, the description of control system 1000 depicted in FIG. 10 is intended only as a specific example. Many other configurations having more or fewer components than the system depicted in FIG. 10 are possible.

In the foregoing specification, aspects of the subject matter are described with reference to specific embodiments thereof, but is not limited thereto. Various features and aspects of the disclosure may be used individually or jointly. Further, embodiments can be utilized in any number of environments and applications beyond those described herein without departing from the broader scope of the specification. The specification and drawings are, accordingly, to be regarded as illustrative rather than restrictive.

In the foregoing description, for the purposes of illustration, methods were described in a particular order. In some cases, the methods may be performed in a different order than that described. In some cases, the methods described above may be performed by hardware components or may be embodied in sequences of machine-executable instructions, which may be used to cause a machine, such as a special-purpose processor or logic circuits programmed with the instructions, to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

As used below, any reference to a series of examples is to be understood as a reference to each of those examples disjunctively (e.g., "Examples 1-4" is to be understood as "Examples 1, 2, 3, or 4").

Example 1 is a method for characterizing vibrations for optimizing drilling operations, comprising generating vibration characterization data for a downhole component of a drilling system, the drilling system including equipment that is adjustable to control operational parameters of the drilling system based on settings, the vibration characterization data including information that characterizes vibrational intensity of the downhole component with respect to the settings over a range of the settings, wherein generating the vibration characterization data includes: selecting a starting coordinate of the settings that corresponds to a target value of the vibrational intensity of the downhole component; and iteratively identifying subsequent coordinates of the settings, wherein identifying a subsequent coordinate includes determining a change for each of the settings such that the subsequent coordinate corresponds to the target value of the vibrational intensity.

Example 2 is the method of example 1, wherein selecting the starting coordinate includes selecting a pre-tracing coordinate as a current coordinate; determining a current value of the vibrational intensity at the pre-tracing coordinate; and moving the current coordinate until the current value of the vibrational intensity equals the target value of the vibrational intensity.

Example 3 is the method of examples 1 or 2, wherein determining the change for each of the settings such that the subsequent coordinate corresponds to the target value of the vibrational intensity includes calculating the change for each of the settings of the equipment based on a model.

Example 4 is the method of examples 1-3, wherein determining the change for each of the settings such that the subsequent coordinate corresponds to the target value of the vibrational intensity includes incrementally adjusting the settings of the equipment to a new coordinate and receiving a measurement of the vibrational intensity corresponding to the new coordinate until the measurement of the vibrational intensity equals the target value of the vibrational intensity.

Example 5 is the method of examples 1-4, further comprising receiving a reporting signal containing information representative of current settings for the equipment; determining an estimated value of the vibrational intensity of the downhole component using the vibration characterization data and calibration data; receiving a sensor signal containing information representative of an actual value of the vibrational intensity of the downhole component; determining an offset by comparing the estimated value of the vibrational intensity to the information representative of the actual value of the vibrational intensity; and updating the calibration data using the offset, wherein the calibration data, when updated, improves accuracy of the vibration characterization data with respect to determining an additional estimated value of the vibrational intensity of the downhole component.

Example 6 is the method of example 5, further comprising comparing the offset to a threshold value, wherein updating the calibration data occurs only when the offset exceeds the threshold value.

Example 7 is the method of examples 1-6, wherein the settings include at least two settings selected from the group consisting of weight-on-bit, rotational speed, and mud circulation.

Example 8 is the method of examples 1-7, further comprising selecting new settings for the equipment based on the vibration characterization data to optimize an output variable, wherein the output variable is selected from the group consisting of mud usage, rate of penetration, operational cost, and drill bit wear.

Example 9 is a computer-program product tangibly embodied in a non-transitory machine-readable storage medium, including instructions configured to cause a data processing apparatus to perform operations including generating vibration characterization data for a downhole component of a drilling system, the drilling system including equipment that is adjustable to control operational parameters of the drilling system based on settings, the vibration characterization data including information that characterizes vibrational intensity of the downhole component with respect to the settings over a range of the settings, wherein generating the vibration characterization data includes: selecting a starting coordinate of the settings that corresponds to a target value of the vibrational intensity of the downhole component; and iteratively identifying subsequent coordinates of the settings, wherein identifying a subsequent coordinate includes determining a change for each of the settings such that the subsequent coordinate corresponds to the target value of the vibrational intensity.

Example 10 is the computer-program product of example 9, wherein selecting the starting coordinate includes selecting a pre-tracing coordinate as a current coordinate; determining a current value of the vibrational intensity at the pre-tracing coordinate; and moving the current coordinate until the current value of the vibrational intensity equals the target value of the vibrational intensity.

Example 11 is the computer-program product of examples 9 or 10, wherein determining the change for each of the settings such that the subsequent coordinate corresponds to the target value of the vibrational intensity includes calculating the change for each of the settings of the equipment based on a model.

Example 12 is the computer-program product of examples 9-11, wherein determining the change for each of the settings such that the subsequent coordinate corresponds to the target value of the vibrational intensity includes incrementally adjusting the settings of the equipment to a new coordinate and receiving a measurement of the vibrational intensity corresponding to the new coordinate until the measurement of the vibrational intensity equals the target value of the vibrational intensity.

Example 13 is the computer-program product of examples 9-12, wherein the operations further include receiving a reporting signal containing information representative of current settings for the equipment; determining an estimated value of the vibrational intensity of the downhole component using the vibration characterization data and calibration data; receiving a sensor signal containing information representative of an actual value of the vibrational intensity of the downhole component; determining an offset by comparing the estimated value of the vibrational intensity to the information representative of the actual value of the vibrational intensity; and updating the calibration data using the offset, wherein the calibration data, when updated, improves accuracy of the vibration characterization data with respect to determining an additional estimated value of the vibrational intensity of the downhole component.

Example 14 is the computer-program product of example 13, wherein the operations further include comparing the offset to a threshold value, wherein updating the calibration data occurs only when the offset exceeds the threshold value.

Example 15 is the computer-program product of examples 9-14, wherein the settings include at least two settings selected from the group consisting of weight-on-bit, rotational speed, and mud circulation.

Example 16 is the computer-program product of examples 9-15, wherein the operations further include selecting new settings for the equipment based on the vibration characterization data to optimize an output variable, wherein the output variable is selected from the group consisting of mud usage, rate of penetration, operational cost, and drill bit wear.

Example 17 is a system for optimizing a drilling operation, comprising a drilling control module couplable to a drilling system having a downhole component to transmit control signals to equipment of the drilling system, the equipment being adjustable to control operational parameters of the drilling system based on settings, the drilling control module further couplable to the drilling system to receive a measurement signal containing information related to a measured value of vibrational intensity of the downhole component and to provide a reporting signal containing information related to current settings of the equipment; and a calibration module couplable to the drilling system or the drilling control module to receive the measurement signal, the calibration module being coupled to the drilling control module to receive the reporting signal, the calibration module being coupled to memory containing calibration data and vibration characterization data, the vibration characterization data including information that characterizes the vibrational intensity of the downhole component with respect to the settings for the equipment over a range of coordinates of the settings, the calibration module including a processor to determine an estimated value of the vibrational intensity using the vibration characterization data and the calibration data, the calibration module being further coupled to the memory to update the calibration data based on a comparison between the estimated value of the vibrational intensity and the information related to the measured value of the vibrational intensity from the measurement signal.

Example 18 is the system of example 17, wherein the calibration module is further coupled to the drilling control module to provide instructions for updating the settings, wherein the instructions for updating the settings are based on the vibration characterization data and the calibration data.

Example 19 is the system of examples 17 or 18, wherein the operational parameters include weight-on-bit, the equipment includes a drawworks for controlling the weight-on-bit, and the settings include a setting for controlling the weight-on-bit.

Example 20 is the system of examples 17-19, wherein the operational parameters include rotational speed of the downhole component, the equipment includes a top drive for controlling the rotational speed, and the settings include a setting for controlling the rotational speed.

What is claimed is:

1. A method for optimizing drilling operations, comprising:
   generating vibration characterization data for a downhole component of a drilling system, the drilling system including equipment that is adjustable to control operational parameters of the drilling system based on settings, the vibration characterization data including information that characterizes vibrational intensity of the downhole component with respect to the settings over a range of the settings, wherein generating the vibration characterization data includes:
      selecting a target vibrational intensity for the downhole component;
      based on selecting the target vibrational intensity, determining a particular coordinate comprising a set of operational parameters of the settings that corresponds to the target vibrational intensity; and
      starting from the particular coordinate, iteratively identifying subsequent coordinates of the settings that correspond to the target vibrational intensity to generate a vibrational mapping of the set of operational parameters of the drilling system, wherein identifying a subsequent coordinate includes determining a change for each of the settings such that the subsequent coordinate corresponds to the target vibrational intensity; and
   controlling the drilling operations using the vibrational mapping.

2. The method of claim 1, wherein determining the particular coordinate includes:
   selecting a pre-tracing coordinate as a current coordinate;
   determining a current value of the vibrational intensity at the pre-tracing coordinate;
   moving the current coordinate until the current value of the vibrational intensity equals the target vibrational intensity; and
   based on the current coordinate corresponding the target vibrational intensity, selecting the current coordinate as the particular coordinate.

3. The method of claim 1, wherein determining the change for each of the settings such that the subsequent coordinate corresponds to the target vibrational intensity includes calculating the change for each of the settings of the equipment based on a model.

4. The method of claim 1, wherein determining the change for each of the settings such that the subsequent coordinate corresponds to the target vibrational intensity includes incrementally adjusting the settings of the equipment to a new coordinate and receiving a measurement of the vibrational intensity corresponding to the new coordinate until the measurement of the vibrational intensity equals the target vibrational intensity.

5. The method of claim 1, further comprising:
   receiving a reporting signal containing information representative of current settings for the equipment;
   determining an estimated value of the vibrational intensity of the downhole component using the vibration characterization data and calibration data;
   receiving a sensor signal containing information representative of an actual value of the vibrational intensity of the downhole component;
   determining an offset by comparing the estimated value of the vibrational intensity to the information representative of the actual value of the vibrational intensity; and
   updating the calibration data using the offset, wherein the calibration data, when updated, improves accuracy of the vibration characterization data with respect to determining an additional estimated value of the vibrational intensity of the downhole component.

6. The method of claim 5, further comprising comparing the offset to a threshold value, wherein updating the calibration data occurs only when the offset exceeds the threshold value.

7. The method of claim 1, wherein the settings include at least two settings selected from the group consisting of weight-on-bit, rotational speed, and mud circulation.

8. The method of claim 1, further comprising selecting new settings for the equipment based on the vibration characterization data to optimize an output variable, wherein the output variable is selected from the group consisting of mud usage, rate of penetration, operational cost, and drill bit wear.

9. A computer-program product tangibly embodied in a non-transitory machine-readable storage medium, including instructions configured to cause a data processing apparatus to perform operations including:
   generating vibration characterization data for a downhole component of a drilling system, the drilling system including equipment that is adjustable to control operational parameters of the drilling system based on settings, the vibration characterization data including information that characterizes vibrational intensity of the downhole component with respect to the settings over a range of the settings, wherein generating the vibration characterization data includes:
      selecting a target vibrational intensity for the downhole component;
      based on selecting the target vibrational intensity, determining a particular coordinate comprising a set of operational parameters of the settings that corresponds to the target vibrational intensity; and
      starting from the particular coordinate, iteratively identifying subsequent coordinates of the settings that correspond to the target vibrational intensity to generate a vibrational mapping of the set of operational parameters of the drilling system, wherein identifying a subsequent coordinate includes determining a change for each of the settings such that the subsequent coordinate corresponds to the target vibrational intensity; and controlling drilling operations of the drilling system using the vibrational mapping.

10. The computer-program product of claim 9, wherein determining the particular coordinate includes:
selecting a pre-tracing coordinate as a current coordinate;
determining a current value of the vibrational intensity at the pre-tracing coordinate;
moving the current coordinate until the current value of the vibrational intensity equals the target vibrational intensity; and
based on the current coordinate corresponding the target vibrational intensity, selecting the current coordinate as the particular coordinate.

11. The computer-program product of claim 9, wherein determining the change for each of the settings such that the subsequent coordinate corresponds to the target vibrational intensity includes calculating the change for each of the settings of the equipment based on a model.

12. The computer-program product of claim 9, wherein determining the change for each of the settings such that the subsequent coordinate corresponds to the target vibrational intensity includes incrementally adjusting the settings of the equipment to a new coordinate and receiving a measurement of the vibrational intensity corresponding to the new coordinate until the measurement of the vibrational intensity equals the target vibrational intensity.

13. The computer-program product of claim 9, wherein the operations further include:
receiving a reporting signal containing information representative of current settings for the equipment;
determining an estimated value of the vibrational intensity of the downhole component using the vibration characterization data and calibration data;
receiving a sensor signal containing information representative of an actual value of the vibrational intensity of the downhole component;
determining an offset by comparing the estimated value of the vibrational intensity to the information representative of the actual value of the vibrational intensity; and
updating the calibration data using the offset, wherein the calibration data, when updated, improves accuracy of the vibration characterization data with respect to determining an additional estimated value of the vibrational intensity of the downhole component.

14. The computer-program product of claim 13, wherein the operations further include comparing the offset to a threshold value, wherein updating the calibration data occurs only when the offset exceeds the threshold value.

15. The computer-program product of claim 9, wherein the settings include at least two settings selected from the group consisting of weight-on-bit, rotational speed, and mud circulation.

16. The computer-program product of claim 9, wherein the operations further include selecting new settings for the equipment based on the vibration characterization data to optimize an output variable, wherein the output variable is selected from the group consisting of mud usage, rate of penetration, operational cost, and drill bit wear.

17. A system for optimizing a drilling operation, comprising:
a drilling control module couplable to a drilling system having a downhole component to transmit control signals to equipment of the drilling system, the equipment being adjustable to control operational parameters of the drilling system based on settings, the drilling control module further couplable to the drilling system to receive a measurement signal containing information related to a measured value of vibrational intensity of the downhole component and to provide a reporting signal containing information related to current settings of the equipment, the drilling control module including a first processor to generate vibration characterization data, wherein generating the vibration characterization data includes:
selecting a target vibrational intensity for the downhole component;
based on selecting the target vibrational intensity, determining a particular coordinate comprising a set of the operational parameters of the settings that corresponds to the target vibrational intensity of the downhole component; and
starting from the particular coordinate, iteratively identifying subsequent coordinates of the settings that correspond to the target vibrational intensity to generate a vibrational mapping of the set of the operational parameters of the drilling system, wherein identifying a subsequent coordinate includes determining a change for each of the settings such that the subsequent coordinate corresponds to the target vibrational intensity; and
a calibration module couplable to the drilling system or the drilling control module to receive the measurement signal, the calibration module being coupled to the drilling control module to receive the reporting signal, the calibration module being coupled to memory containing calibration data and vibration characterization data, the vibration characterization data comprising the vibrational mapping that characterizes the vibrational intensity of the downhole component with respect to the settings for the equipment over a range of the coordinates of the settings, the calibration module including a second processor to determine an estimated value of the vibrational intensity using the vibration characterization data and the calibration data, the calibration module being further coupled to the memory to update the calibration data based on a comparison between the estimated value of the vibrational intensity and the information related to the measured value of the vibrational intensity from the measurement signal.

18. The system of claim 17, wherein the calibration module is further coupled to the drilling control module to provide instructions for updating the settings, wherein the instructions for updating the settings are based on the vibration characterization data and the calibration data.

19. The system of claim 17, wherein the operational parameters include weight-on-bit, the equipment includes a drawworks for controlling the weight-on-bit, and the settings include a setting for controlling the weight-on-bit.

20. The system of claim 17, wherein the operational parameters include rotational speed of the downhole component, the equipment includes a top drive for controlling the rotational speed, and the settings include a setting for controlling the rotational speed.

* * * * *